US008583521B2

(12) United States Patent
Couch

(10) Patent No.: US 8,583,521 B2
(45) Date of Patent: Nov. 12, 2013

(54) SYSTEM AND METHOD FOR PROCESSING INVESTMENT TRANSACTIONS

(76) Inventor: Robert Couch, Dallas, TX (US)

( * ) Notice: Subject to any disclaimer, the term of this patent is extended or adjusted under 35 U.S.C. 154(b) by 1190 days.

(21) Appl. No.: 11/868,892

(22) Filed: Oct. 8, 2007

(65) Prior Publication Data

US 2009/0089219 A1      Apr. 2, 2009

Related U.S. Application Data

(60) Provisional application No. 60/976,263, filed on Sep. 28, 2007.

(51) Int. Cl.
G06Q 40/00      (2012.01)

(52) U.S. Cl.
USPC .............................................. 705/35; 705/36

(58) Field of Classification Search
USPC .................................. 705/36 R, 35
See application file for complete search history.

(56) References Cited

U.S. PATENT DOCUMENTS 6,925,441 B1 *   8/2005   Jones et al. .................. 705/7.33
2008/0065561 A1 *   3/2008   Ethridge et al. ............ 705/36 R

OTHER PUBLICATIONS

Marton, Andrew; "Brokers Who Would Be Lenders"; Institutional Investor; Sep. 1987.*
Kirby, Anthony; "Asset management"; iCB Magazine; Nov./Dec. 1994.*

* cited by examiner

Primary Examiner — Edward Chang
(74) Attorney, Agent, or Firm — Baker Botts L.L.P.

(57) ABSTRACT

A method for processing investment transactions includes receiving investor information regarding each of a plurality of investors. The investor information may include, an identity, a minimum investment per unique investment and a minimum number of required unique investments. Each of the plurality of investors may be signatory to a respective general partnership agreement that share a common general partner. Some of the investor information may be derived from the terms of the general partnership agreement. The method may also include notifying the plurality of investors of a future unique investment opportunity. In accordance with a particular embodiment, for each particular investor of the plurality of investors, it is determined whether the particular investor will participate in the future unique investment.

20 Claims, 11 Drawing Sheets

OIL2 HOLDINGS, INC.
PRIVATE PLACEMENT MEMORANDUM
INFORMATION WORKSHEET

| JOHN DOUGH PROSPECT |
|---|

| Name of Program: | Oil2 John Dough Prospect, LP | Date on PPM: | 2/31/2007 |
|---|---|---|---|

| Type of Program (check one): | | Type of Well (check one): | |
|---|---|---|---|
| Turnkey: | XXXX | Oil (Only): | |
| Non-Turnkey: | | Gas (Only): | |
| Partial Turnkey: | | Oil & Gas: | XXXXX |

| Total # of Units: | 44 | (To Be Sold) | Total Offering Amount | $187,285.71 |
|---|---|---|---|---|

Total Unit Price  $4,256.50

| Total Base Costs from AFE (from Operator): | | $12,000,000.00 (Sum of 3 Amounts from Below) |
|---|---|---|
| Leases, Geology, Seismic, etc. $ | $1,000,000.00 | (without Carries or Back-in) |
| Drilling & Testing $ | $10,000,000.00 | (without Carries or Back-in) |
| Completion $ | $1,000,000.00 | (without Carries or Back-in) |

| Participation Agreement Terms: | | | Retail Cost Multiplier Per 1% Working Interest | | |
|---|---|---|---|---|---|
| Operator Back-in? | NO | How Much? 0.0000% | Lease=Heads-Up? yes 1.904761905 | | |
| Operator Carry? | YES | How Much? 25.0000% | Lease, G&G, etc. | 1% | $14,285.71 |
| Oil2 Carry? | NO | How Many Points? 0.0000% | Working Capital | 1% | $30,666.67 |
| BD Commission | | How Much? 13.0000% | Drilling & Testing | 1% | $190,476.19 |
| Oil2 Management Fee | | How Much? 17.0000% | Completion | | $14,285.71 | of Partnership units equiv. to oil2 carry   0   FINAL DT: $235,714.29   C: $14,000.00
Percentage of Partnership of oil2 carry   0.00%

| SANITY | CHECKS |
|---|---|
| units | 44 |
| price per | $4,256.50 |
| total amount | $187,285.98 |
| | $164,285.98 |
| Less Comm | $49,285.79 |
| total due PG | $115,000.18 |

| SANITY | CHECKS |
|---|---|
| W,I | 0.750000 |
| DT&C | $249,714.29 |
| Tot Amount | $187,285.71 |
| less W.C. | $164,285.71 |
| less Comm | $49,285.71 |
| total due PG | $115,000.00 |

| Working Interest and Net Revenue Interest Allocations: CARRY TO TANKS | | | | |
|---|---|---|---|---|
| NRI MULTIPLIER: 75.00% | Before COMPLETION | | After COMPLETION | |
| TOTAL WORKING INTEREST AS IT IS | WI% | NRI% | WI% | NRI% |
| AFFECTED BY A OPERATOR CARRY: | 1.00000000% | 0.75000000% | 0.75000000% | 0.56250000% |
| Partnership WI as a Decimal BCP/ACP: | 1.00000000% | 0.75000000% | 0.75000000% | 0.56250000% |
| WI Per Unit (Divide by # of Units): | 0.02272727% | 0.01704545% | 0.01704545% | 0.01278409% |
| | Before Payout BACK-IN | | After Payout BACK-IN | |
| TOTAL WORKING INTEREST AS IT IS | WI% | NRI% | WI% | NRI% |
| AFFECTED BY A BACKIN: | 0.00000000% | 0.00000000% | 0.00000000% | 0.00000000% |
| Partnership WI as a Decimal BPO/APO | 0.00000000% | 0.00000000% | 0.00000000% | 0.00000000% |
| WI Per Unit (Divide by # of Units) | 0.00000000% | 0.00000000% | 0.00000000% | 0.00000000% |

MAKE SURE THE TWO UNITS INSTAL
ADD UP TO EXACT UNIT PRICE
$235,714.28

| Calculation of Gross & Unit Installment Payments (Including Carries and/or Back-In): | | | |
|---|---|---|---|
| TOTALS FOR OFFERING | | Total Working % BCP: | 1.00000000% |
| Operator's Share (from AFE): | $115,000.00 | Total Working % ACP: | 0.75000000% |
| Oil2's Share (15%): | $24,642.86 | Total Working % BPO: | 0.00000000% |
| Couch Financial's Share (13%): | $21,357.14 | Total Working % APO: | 0.00000000% |
| Legal Expenses (2%) | $3,285.71 | Total WI % / unit BCP: | 0.02272727% |
| Working Capital (20%): | $23,000.00 | Total WI % / unit ACP: | 0.01704545% |
| | $187,285.71 | Total WI % / unit BPO | 0.00000000% |
| | | Total WI % / unit APO: | 0.00000000% |

*FIG. 5A*

| Well Information: | | Primary Objective: Cha-ching | FT: | 11,111 |
| --- | --- | --- | --- | --- |
| Target Depth: | 11,111    Feet | Secondary Objective: | FT: | |
| County / Parish: | Paydirt County, Texas | Third Objective: | FT: | |
| API#: | | Fourth Objective: | FT: | |
| Operator: | Drill 'Em Deep Petroleum | Fifth Objective: | FT: | |
| Legal Description of Well Location: | | | | |

Lease Information:
  Leasor(s):                          Leasee(s):
  Lease Date(s):                      Lease Expires:
  Recorded: Volume:   Book: _____   Page:       CO./Parish/ST:   Paydirt County, Texas

| WELL APPROVALS / NON-APPROVALS: | APPROVED | NOT APPROVED | |
| --- | --- | --- | --- |
| | | | |
| Charles Couch; Prospect & Operator Evaluation | APPROVED | NOT APPROVED | DATE |
| Boris Starokozhev; Geological & Perform. Evaluation | APPROVED | NOT APPROVED | DATE |
| Sheri Shideler; Legal & Agreement Terms | APPROVED | NOT APPROVED | DATE |
| Jim Ramsbottom; Agreement & Operator Performance | APPROVED | NOT APPROVED | DATE |
| Controller; Financial Terms & ROI | APPROVED | NOT APPROVED | DATE |
| Robert Couch; Overall Business Approval | APPROVED | NOT APPROVED | DATE |
| Blair Stephenson; Impact on Operations | APPROVED | NOT APPROVED | DATE |
| Bill Porter; Impact on Sales & Brokers | APPROVED | NOT APPROVED | DATE |

*FIG. 5B*

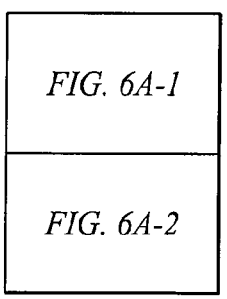

*FIG. 6A*

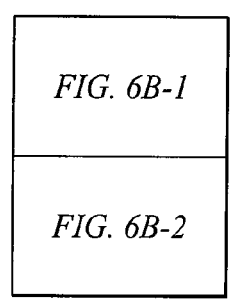

*FIG. 6B*

| Oil2 John Dough Prospect, LP | | | 20% Fee based on AFE |
|---|---|---|---|
| Wholesale is now Cost + 20% | | Shift of 2% COMP. In | Calc. Below |
| Input Parameters | | | |
| Operator Carry % TO TANKS | 25.0000% | Total % b 4 carry | 1.0000% |
| Couch Margin % | 20.00% | after carry | 0.7500% |
| Broker Comish % | 10.00% | AT 25% CARRY | 0.75% |
| Total Points from operator | 0.7500 | COUCH CARRY | 0.00% |
| # Points Couch Carried | 0.00 | SUBJ. GRADE | 0 |
| Calculated Multiplier | This Number is applied to each item in the AFE 1.904761905 | | |
| Total Points from operator | 0.7500% | | |
| Lease Costs "Heads Up?" | yes | | |
|  | Numbers from Operators AFE and Part Agr. | Couch Cost with Operator Carry | Investor Cost Per 1% |
| Lease and G&G | $1,000,000.00 | $7,500.00 | $14,285.71 |
| D&T (DHC) | $10,000,000.00 |  | $190,476.19 |
| FIXED Conting. 20% |  | $23,000 | $30,666.67 |
| (Calc. on Total AFE) |  | Total D&T | $235,428.57 |
| Completion (Estimated) | $1,000,000.00 | $7,500.00 | $14,285.71 |
| P&A | $0.00 | $0.00 | $0.00 |
| Total | $12,000,000.00 | $115,000.00 | $219,047.62 |
| 100% AFE: | $21,904,761.90 | | |
| Total money raised | $187,285.71 | D & T (w/o 20%) | $204,761.90 |
| 10% com broker | $16,428.57 | Comp. (w/o 20%) | $14,285.71 |
| 2% Registration Allocation | $3,285.71 | Total (w/o 20%) | $219,047.62 |
| 3% Compliance Charge | $4,928.57 | Conting. Fee @ 20% | $30,666.67 |
| Registration shorfall | $11,714.29 | Total WITH 20% | $249,714.29 |
| Couch Compensation | $16,378.57 | Retail w/ 20% and 2% COMP. Shift | Wholesale cost + 20% and 2% COMP. Shift |
| cost due operator | $134,550.00 | $205,047.61 | $179,416.66 |
| Prtnrs contingency 20% | $23,000.00 | $30,666.67 | $30,666.67 |
| Crosscheck Calc.= | $23,000.00 | $13,999.99 | $12,249.99 |
| NRI |  | 75.00% | $249,714.27 | $222,333.32 |
|  | BCF |  | GROSS Return | ROI @ $5.50/MCF |
| Probable | 25 | $ | 103,125,000 | 4.7 |
| Possible | 50 | $ | 199,375,000 | 9.1 |
| PRODUCTION RATE MCFD | | | | Payout Months |
| Probable | 10,000 | $ | 1,237,500.00 | 17.70 |
| Possible | 20,000 | $ | 2,475,000.00 | 8.85 |

Welltracker®

Investments | Resources | Logout

Welcome, today is . 8 May 2007

Investment Portfolio for Oil2 April 06 Fund LTD. (12078)

Oil2 April 06 Fund LTD. 12078

| Well | Well Interest | OT | WC | Overruns | Comp | Total | Paid | Total Due | View K1 Depreciation | Call Data |
|---|---|---|---|---|---|---|---|---|---|---|
| 11613-Holly 30 Prospect 11654 | 0.0013714169 | $14,928.38 | $2,609.65 | $0.00 | $3,711.97 | $40,759.63 | $42,030.50 | ($1,270.87) | | |
| 11777-Gutierrez #1 Prospect | 0.0049861947 | $13,705.61 | $2,609.65 | $0.00 | $4,934.74 | $30,135.01 | $21,250.00 | $8,885.11 | | |
| 11850-Patterson #1 Prospect | 0.0020717638 | $13,457.21 | $2,609.65 | $0.00 | $5,183.14 | $22,648.44 | $21,250.00 | $1,398.44 | | |
| 11929-Beach City Prospect 11656 | 0.002387586 | $15,227.91 | $2,609.65 | $0.00 | $3,412.44 | $32,673.23 | $30,065.58 | $2,609.65 | | |
| 12116-Zinfandel - Ship Shoal Development 72 | 0.0011227838 | $11,539.57 | $2,609.65 | $0.00 | $7,100.78 | $21,250.00 | $21,250.00 | ($0.00) | | |
| 12137-North Laurel Ridge Prospect | 0.0011320051 | $12,550.89 | $2,609.65 | $0.00 | $5,689.46 | $28,209.78 | $24,986.03 | $9,223.75 | | |
| 12138-Northwest Ridge Farm | 0.001696781 | $15,561.71 | $2,609.65 | $0.00 | $3,078.64 | $28,604.19 | $25,324.75 | $3,279.44 | | |
| 12160-Ship Shoal shiraz C Prospect LP | 0.0010744603 | $12,266.37 | $2,609.65 | $0.00 | $6,373.98 | $21,250.00 | $21,250.00 | $0.00 | | |
| 12161-Ship Shoal Sangria Prospect LP | 0.0009883338 | $11,752.09 | $2,609.65 | $0.00 | $6,888.26 | $21,250.00 | $21,250.00 | $0.00 | | |
| 12574 Chatham Farms | 0.0011320051 | $7,115.90 | $1,381.47 | $0.00 | $2,751.71 | $11,249.08 | $11,249.08 | $0.00 | | |

Request a Commitment

*FIG. 6B-1*

Welltracker®

Welcome, today is . 8 May 2007

| Investments | Resources | Logout |

Depreciation Listing for Oil2 April 06 Fund LTD. (12078)

Oil2 April 06 Fund LTD.
12078

Note: As a convenience to our investors has created a single list for you K1 Depreciation. This list is segmented into two areas. The depreciation for investments made within the last tax year and the depreciation list for investments made in prior years.

1. Depreciation for the Past Tax Year

| Prospect | Amount | Intangible | Tangible | Investment Date | Depreciation Year | Depreciation | Depreciation Method |
|---|---|---|---|---|---|---|---|
| Allan Bloxsom #2 Prospect | 15038.94 | 0 | 30062841.06 | 5/8/2006 | 2006 | 6012568.212 | 5 year straight line |
| Allan Bloxsom #2 Prospect | 3601.41 | 0 | 7199218.59 | 5/8/2006 | 2006 | 1439843.718 | 5 year straight line |
| Allan Bloxsom #2 Prospect | 2609.65 | 0 | 5216690.35 | 5/8/2006 | 2006 | 1043338.07 | 5 year straight line |
| Beach City Prospect | 15227.91 | 0 | 30440592.09 | 5/8/2006 | 2006 | 6088118.418 | 5 year straight line |
| Beach City Prospect | 3412.44 | 0 | 6821467.56 | 5/8/2006 | 2006 | 1364293.512 | 5 year straight line |
| Beach City Prospect | 2609.65 | 0 | 5216690.35 | 5/8/2006 | 2006 | 1043338.07 | 5 year straight line |
| Beach City Prospect | 2609.65 | 0 | 5216690.35 | 12/13/2006 | 2006 | 1043338.07 | 5 year straight line |
| Beach City Prospect | -2609.65 | 0 | -5216690.35 | 12/13/2006 | 2006 | 1043338.07 | 5 year straight line |

*FIG. 6C*

SYSTEM AND METHOD FOR PROCESSING INVESTMENT TRANSACTIONS

CROSS-REFERENCE TO RELATED APPLICATION

This application claims priority under 35 U.S.C. §119(e) to U.S. Provisional Patent Application Ser. No. 60/976,263, filed on Sep. 28, 2007, which is hereby incorporated by reference in its entirety.

TECHNICAL FIELD OF THE INVENTION

The present invention relates generally to automated, electronic processing mechanisms and more particularly, to a system and method for processing investment transactions.

BACKGROUND OF THE INVENTION

Investing in large-scale volatile investments can be a significant drain on the time, money and resources of the investor. Accordingly, such investment systems often do not justify the associated relative risk to the individual investor. As an example, and not by way of limitation, it is difficult, risky and expensive for investors of low to moderate net worth (e.g., less than $3M) to invest in oil and gas wells. Exploration and drilling requires substantial capital and is typically funded by large-scale businesses and investors.

Speculative and costly investments like oil and gas wells typically include a complex vertical investment structure including individual investors, brokers, dealers, operators, leaseholders, and owners (equipment, land, resources, etc. . . . ). This structure and the sheer number of participants reduces the bargaining power and influence that an individual investor can expect as part of the transaction. Individual investors are also susceptible to unscrupulous business practices from any one of the participants in the vertical structure.

In order to protect individual investors from speculative investments and from unscrupulous participants in the investment structure, many laws, regulations and rules are typically promulgated in the industries involved in speculative investments. Such laws, regulations and rules are enacted at the federal, state and local level. Various governing bodies with competent jurisdiction over these industries also enact and enforce many regulations intended to protect individual investors and the public generally. As an example, participation units in certain investments may be classified as securities which trigger federal regulation by the Securities and Exchange Commission ("SEC").

Although the laws, regulations and rules are important safeguards to protect the individual investor, they also add substantial layers of administrative function to each investment. For example, it is not uncommon for agreements executed by investors in a speculative investment to exceed one hundred pages in length, and cover technically complex legal and business issues that are outside the comprehension of an unsophisticated investor. Thus, these administrative procedures make it difficult and undesirable for an individual investor to invest smaller sums of money in any particular speculative investment.

SUMMARY OF THE INVENTION

The present disclosure provides a system and method for processing investment transactions that substantially eliminates or reduces the problems and disadvantages associated with the previous methods and systems. In particular, in accordance with a particular embodiment of the present disclosure, a method for processing investment transactions that includes receiving investor information regarding each of a plurality of investors. The investor information may include an identity, a minimum investment per unique investment and a minimum number of required unique investments. The method may also include notifying the plurality of investors of a future unique investment opportunity. In accordance with a particular embodiment, for each particular investor of the plurality of investors, it is determined whether the particular investor will participate in the future unique investment.

In accordance with another embodiment of the present disclosure, each of the plurality of investors is signatory to a respective general partnership agreement, each of the general partnership agreements sharing a common general partner, and wherein at least some of the investor information is derived from the terms of the general partnership.

In accordance with still another embodiment of the present disclosure, the method further comprises executing a respective unique investment Private Placement Memorandum (PPM) on behalf of each of the particular investors that will participate in the future investment.

In accordance with yet another embodiment of the present disclosure, determining whether the particular investor will participate in the future unique investment may comprise providing each of the plurality of investors with a notification of the future unique investment, and providing a period of time during which the investor can elect to "opt-out" of the investment. In this same embodiment, each of the plurality of investors that fails to respond during the opt-out period is subscribed to the future investment.

In accordance with yet another embodiment of the present disclosure, the unique investments may comprise (but not be limited to) oil and gas wells in geographically diverse locations. In this embodiment, each general partnership agreement may provide for (but not be limited to) a one thousand dollar minimum investment per unique investment and a minimum number of twenty required unique investments.

Technical advantages of the present disclosure include providing an improved system and method for processing investment transactions that facilitates relatively small investments in multiple speculative investments and enhances transparency to the individual investor(s). Thus, the investments provide individual investors substantial latitude with respect to portfolio diversification.

Another technical advantage of the present invention includes providing a system and method for processing investment transactions that distributes an investor's investments funds among a large number of speculative investments. Thus, investor risk is minimized, as compared to participation in any one of the speculative investments, and the average return per investor is increased.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIGS. 5A-5C illustrate an Information Worksheet in accordance with a particular embodiment of the present disclosure; and FIGS. 6A-6C illustrate aspects of a CRM tool, in accordance with a particular embodiment of the present disclosure.

DETAILED DESCRIPTION OF THE INVENTION

Figure 1:
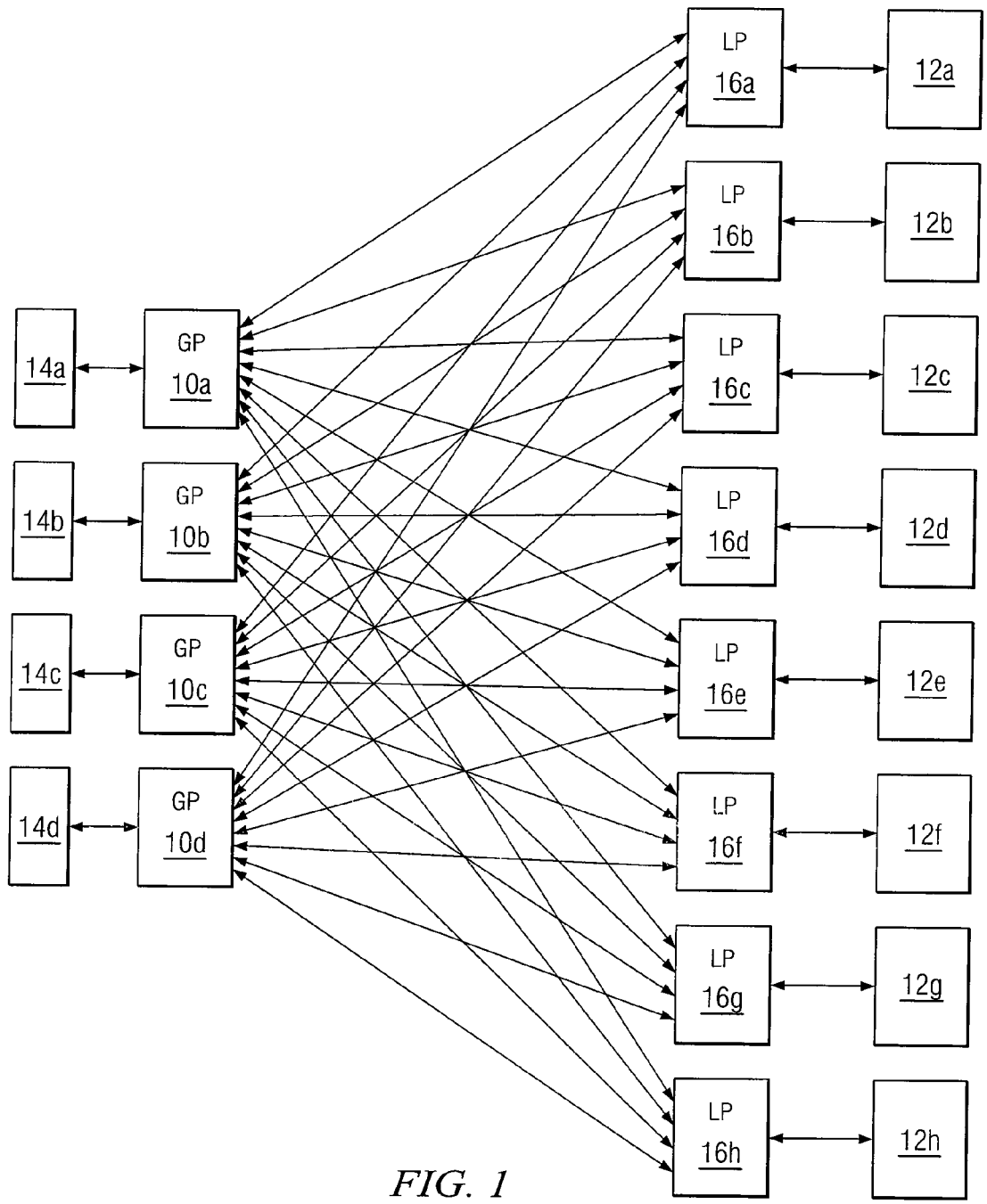
FIG. 1 illustrates an investment structure, in accordance with a particular embodiment of the present disclosure.

The teachings of the present disclosure provide a unique and effective paradigm for participation in investment transactions. The methods and systems described herein are well-suited for speculative, high transaction cost investments, for example, oil and/or gas resource development. Benefits of the present disclosure are derived through the use of portfolio diversification, which minimizes the risk and delivers a competitive return compared to many other alternative investments. Based upon this paradigm, an investor's annual budget for investment transactions (e.g., oil and/or gas resource development) is spread over a number of unique investments (e.g., minimum of 20 to 40 new oil and gas wells per year).

The present disclosure structures partnerships that permit investors, industry partners, institutions, and other types of investors, or "partners" to participate in speculative investments in a manner tailored to meet practically any risk tolerance and/or reasonable return expectations. These partnerships are structured so that partners can meet their specific objectives by participating in a diversified portfolio of unique investments. Typical partnership portfolios of the present disclosure may contain twenty to one hundred (or more) unique investments. Thus, with regard to oil and gas well investments for example, these portfolios may contain a mix of twenty to one hundred (or more) exploratory, developmental, offset and/or producing well properties, in order to offset the riskiest investments. By "pooling" the resources of many, relatively small investors or institutions, the investment strategies of the present disclosure allow the partnership to work directly with large, established well operators such as Kerr McGee, Yuma Exploration, Anadarko Petroleum, Petroquest Energy, Carrizo Oil & Gas, etc.

The teachings of the present disclosure describe partnerships that purchase working interests in somewhat speculative investments. With regard to oil and gas resource development, the main purpose of these partnerships is to spread the expenses of acquiring, drilling, testing and completing oil and/or gas resource properties (and the subsequent revenues produced) among as many partners as practical in an effort to minimize the investor risks traditionally associated with oil and/or gas exploration.

As described in more detail below, the partnership may include a general partner that is generally directed by a managing partner of the partnership. The general partner and/or managing partner may perform some or all of the tasks below, alone, together and/or with the assistance of a third party industry partner(s). Although many of the examples described herein are generally directed to the oil and gas industry, those of ordinary skill in the art will appreciate that the teachings of the present disclosure are equally applicable to many other types of investment transactions such as real estate, venture capital, aircraft, movies, etc. Oil and gas investment is provided as an example embodiment below, to facilitate a better understanding of at least one potential field of application for the systems and methods of the present disclosure.

In accordance with a particular embodiment of the present disclosure, various aspects of the present disclosure are implemented in an investment method that includes a two-party general partnership. An individual investor (or small business) is one general partner, and a sophisticated investment organization (e.g., an issuer) is the managing general partner. For example, this type of strategy is offered by Oil2 Holdings, Inc., and additional information regarding specific offerings of Oil2 Holdings, Inc. is available at Oil2.com. It is anticipated that the sophisticated investment organization (e.g., Oil2 Holdings, Inc.) would serve as managing general partner in dozens, hundreds, or even thousands of similarly structured general partnerships, each having a respective individual investor (or small business) as a general partner.

The offerings described herein enable each respective investor to invest in a broad, diverse portfolio of investment opportunities by spreading the investor's investment into micro-fractional direct participation ownership, in order to: (i) mitigate the investor's risk; (ii) balance the investor's portfolio; (iii) balance the investor's return; and (iv) maximize the investor's tax advantage(s).

As described below, these offerings are made available and/or enhanced by a proprietary, unique client relationship management (CRM) software system/platform permitting both secure access externally to Investors and Brokers, and internally for a full range of support and accounting services.

In accordance with a particular embodiment of the present disclosure, the first stage of product development in the oil and gas industry begins in the exploration and verification department of the general partner (may also be the issuer), which department spends the majority of its time finding and reviewing potential oil and/or natural gas resource projects that are nearly ready to be financed. After performing a preliminary review and approval of the project in-house at the general partner, the exploration and verification department of the general partner goes to the project's generation source and does a thorough background and historical review of the project using whatever third party consultants or local scientists deemed necessary to do a thorough due diligence review. After collecting and verifying all of the due diligence work, the exploration department defines the probability of the presence and magnitude of hydrocarbons, the expected expenses, as well as the expected returns for further evaluation by the in-house financial department of the general partner (may also be the issuer).

After the project data is compiled into a reviewable form, the exploration and verification department presents its findings and makes its recommendations to the Well Approval Committee which consists of representatives from every company business department. After reviewing the project, the Well Approval Committee decides how much working interest (ownership) in the drilling project will be purchased and will negotiate terms with the project generator (or well operator).

After negotiating an optimal working interest ownership position in the drilling project, all of the information is turned over to the legal department of the general partner (may also be the issuer) for the preparation of the direct participation Private Placement Memorandum (PPM) which explains and discloses every aspect of the project to potential partners and/or investors (offered under Regulation D of Section 5 of the Securities Act of 1933, 15 U.S.C. 77(a), et seq., as amended).

After compiling the PPM and registering all of the necessary documents, the wholly-owned, captive broker-dealer of the general partner is responsible for raising the necessary capital to fund the project through all of its available investment funding options. In accordance with a particular embodiment of the present disclosure, capital may also be raised by external Broker-Dealers who may wholesale these investments to their respective base of Investor Clients.

Once the financing has been completed, the exploration department of the general partner coordinates with the well operator and oversees the actual drilling, testing and completion of each project. Before, during, and for the life of the project, the exploration department reports daily on the minute details of well operations and activity which are available for all interested parties on a weekly basis via e-mail; or online through the disclosed technological platform (system).

The operations department of the general partner (may also be the issuer) is responsible for collecting and maintaining all investor contracts and updating operational and financial details of each project which will also be made available for all interested parties, including individual investor partners.

The financial department of the general partner is responsible for dispersing revenues for each successful project through the most efficient manner of distribution available.

Example embodiments of the present disclosure and its advantages are best understood by referring now in more detail to FIGS. 1-6C of the drawings, in which like numerals refer to like parts.

Figure 2:
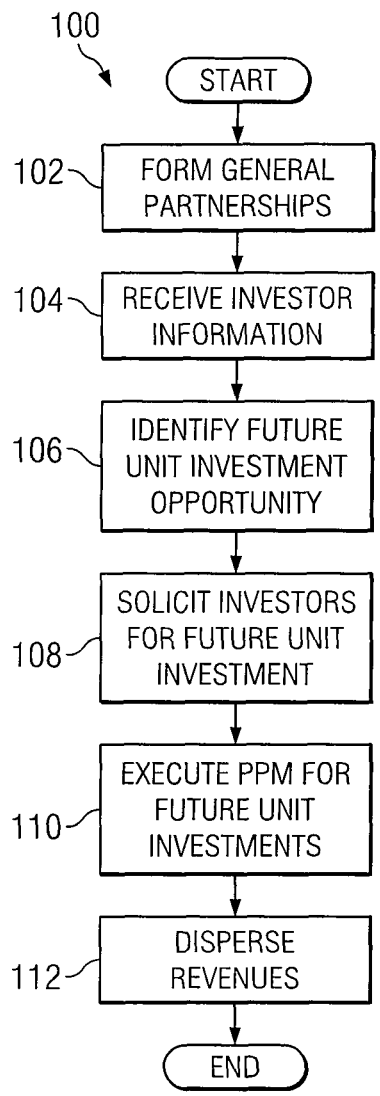
FIG. 2 illustrates a method for processing investment transactions, in accordance with another embodiment of the present disclosure.

A method for processing transactions according to a particular embodiment of the present disclosure and a geographical depiction of a potential structure are illustrated in FIGS. 1 and 2, respectively. In accordance with this embodiment, a plurality of general partnerships are formed at step 102 to participate in a plurality of unique investments 12*a*-12*h*. Each general partnership 10*a*-10*d* includes a managing partner that will typically be the same entity, but can vary in different embodiments. Moreover, each general partnership includes an investment entity (e.g., individual investor, company, etc.). For example, general partnership 10*a* is formed with investment entity 14*a*. General partnerships 10*b*-10*d* are formed with investment entities 14*b*-14*d*, respectively.

In accordance with a particular embodiment of the present invention, each general partnership is memorialized through a separate "Confidential Private Placement Memorandum" (e.g., "Oil2 John Doe General Partnership" available from Oil2 Holdings, Inc.) and is formed for the purpose of acquiring either limited or general partnership interests in limited partnerships which own unique investments (e.g., oil and gas wells, motion picture investing, aircraft ownership, etc.). For reasons to be described later, the one-to-one correlation of investment entities to general partnerships provides significant advantages in the form of automated and streamlined future investment, reduced administration and lowered costs. Thus, the general partnerships are formed to indirectly secure at least working interests in unique investments. Investors are afforded the opportunity to purchase general interests (e.g., units) in the general partnership in order for the investors to participate in the unique investments as well.

In accordance with a particular embodiment of the present disclosure, an investor that invests in a two-party general partnership has purchased one "unit" of the general partnership at a specific cost (e.g., $24,000). The two-party general partnership will invest into at least twenty wells at $1,000 per well. The actual private placement memorandum "unit" for that Well Partnership may typically be defined and offered at $2,000 per unit.

The general partnership typically employs third party industry partners to exploit the unique investments. For example, in accordance with a particular embodiment, the unique investments may comprise a plurality of oil and gas wells 12*a*-12*h*. In this embodiment, the third party industry partners may include the owner of the land, well, or equipment, the well operator, sales professionals, securities professionals, legal and business professionals, scientists and/or consultants.

As described above, each general partnership also has a designated managing partner. The managing partner may be granted the sole authority to deny or accept subscriptions from purchasers 14*a*-14*d*. The managing partner may also be granted broad or exclusive power to select unique investments in which the general partnership may participate. In accordance with another embodiment, unique investments may be selected based upon pre-approved geographic areas, unanimously or majority approved by the partners of the general partnerships.

In general, the general partnerships are formed to acquire working interests in unique investments in multiple geographic locations, with no self-imposed limits on the location or the descriptive nature of any one given unique investment. Subscriptions, or "units" in the general partnership will be made available by a placement agent (or affiliate of the managing partner) on a "best efforts" basis. The unit price may be determined by the issuer with some restrictions.

The Confidential Private Placement Memorandum between the investment entity and the managing partner of the general partnership will include investor information that may include some or all of the items described below, and may include more. For example, the Confidential Private Placement Memorandum may include the number of units and the unit price. Also, the minimum initial subscription price will typically include a minimum aggregate investment and a working capital reserve. The minimum aggregate investment will be determined by multiplying the minimum investment per unique investment and the minimum number of unique investments. It should be noted that the general partnership agreement may also provide for a maximum unique investment and/or maximum aggregate unique investment from any particular participant/investor. The working capital reserve may be used to cover any federal, state, local or other regulatory agency and administrative fees, and/or unique investment cost overruns due to operations. Any balance from the working capital reserve remaining after overruns and expenses may be used to invest in additional unique investments.

In accordance with a particular embodiment of the present disclosure, the unique investments may include investments in oil and gas well drilling. In this embodiment, the minimum investment per well may be $1,000, and a maximum investment per well may be established. In addition, a minimum number of unique investments may be set at twenty (i.e., each investor must participate in at least twenty oil and gas wells over the term of the partnership agreement), and the maximum number of unique investments may be unlimited (i.e., limited only to the number of unique investments selected by the managing partner or the maximum investment amount placed by the investing partner). Thus, the minimum aggregate investment would be twenty thousand dollars (20 units× $1,000/unit=$20,000).

In the same embodiment, the working capital reserve may be four thousand dollars and may be used to cover an annual contribution to the state of Texas for the required Blue Sky Law filing fees of each of the well partnerships. Thus, the minimum initial subscription price will be twenty-four thousand dollars ($20,000 minimum aggregate investment+$4,000 working capital reserve).

Thus, if investment entity 14a formed general partnership 10a with a designated managing partner, investment entity 14a would be required to fund the general partnership with a minimum initial subscription price of twenty-four thousand dollars.

At step 104, the investor information is received by the general partnership and/or managing partner. The investor information may also be received at a Client Relationship Management (CRM) tool, to be described later in more detail. The investor information may include an identity of the investment entity, address(es), contact information, financial information, investor suitability information, unit price, minimum initial subscription price, working capital reserve, minimum aggregate investment, minimum number of unique investments, opt-in or opt-out preferences regarding future investments, etc.

At step 106, a future unique investment opportunity is identified by the general partner and/or managing partner. The future unique investment opportunity may be identified by the general partner according to the method described above.

When a potential future unique investment is identified, investors are solicited for the future unique investment, at step 108. These solicitations may take the form of electronic communication (e.g., email) automatically sent from the CRM tool to prospective investors that are signatory to a general partnership Confidential Private Placement Agreement (e.g. 10a through 10d).

When an investor is identified (e.g., investment entity 14c), a limited partnership is formed for the general partnership (e.g., 10c) to participate in the unique investment (e.g., 12g). The limited partnership is typically memorialized in the form of a limited partnership Confidential Private Placement Agreement (e.g., Oil2 John Dough Prospect, LP Agreement available from Oil2 Holdings, Inc.), between the general partner and the well operator (or well prospect generator or industry partner). Thus, a Confidential Private Placement Memorandum is executed at step 110 for the unique investment entity.

Information about particular investors are collected using an Information Worksheet that is used to collect, record, store and manipulate information in accordance with aspects of the present disclosure. The information identified on the Information Worksheet (e.g., FIGS. 5A-5C) may be used, for example to collect information, generate an Excel spreadsheet, and mail merge file is used to generate a PPM for a particular investor.

As illustrated in FIG. 1, each general partnership that intends to participate in a unique investment executes a limited partnership Confidential Private Placement Memorandum for each unique investment, in order to form respective limited partnerships 16a-16h with the owners or operators of the unique investment.

Finally, at step 112, revenues from the unique investments are distributed to investors. The investor returns from this structure are intended to include the investor's principal and to maximize the investor's tax advantages. This is intended to create a return that is consistent and competitive with other investment vehicles in the market. This structure also creates a vehicle that can be leveraged, to increase the level of return while mitigating risk and balancing reward.

In accordance with a particular embodiment of the present disclosure, the managing partner of the general partnerships may be the actual issuer of the unique investment limited partnership (under Regulation D). An In-House FINRA-registered Broker Dealer provides a legal mechanism for a broker to sell a "security" and/or solicit new clients under Regulation D private placement. This structure provides FINRA arbitrator protection for the issuer and further legitimizes the broker in the investing world. This structure also provides for additional investor confidence through an SEC and FINRA licensed and federally regulated entity (the Broker Dealer).

As discussed above, methods and systems of the present disclosure may benefit from a proprietary tool. In accordance with a particular embodiment of the present disclosure, the CRM tool comprises a tool developed by Oil2 Holdings, Inc. and referred to as "WellTracker." WellTracker is a web-based software application that is externally accessible by investors and brokers while being used internally by staff to manage all aspects of investor and broker activity and relationships. WellTracker includes the capability to take reservations for new drilling (investment) opportunities online. WellTracker may also be used to accomplish on-line reporting and to maintain well reference and performance documentation.

Figures 1, 6A:
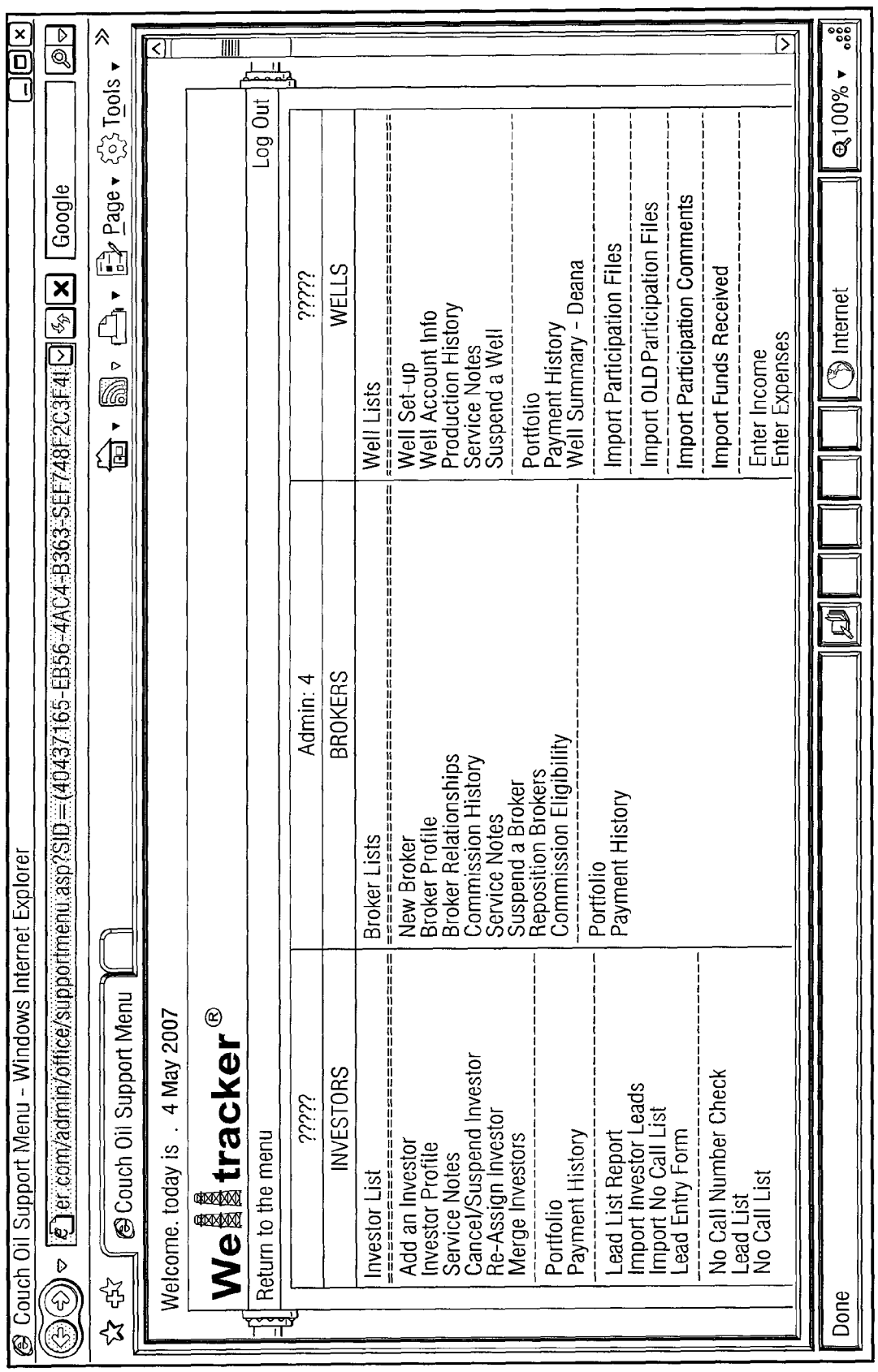
Figures 2, 6B:
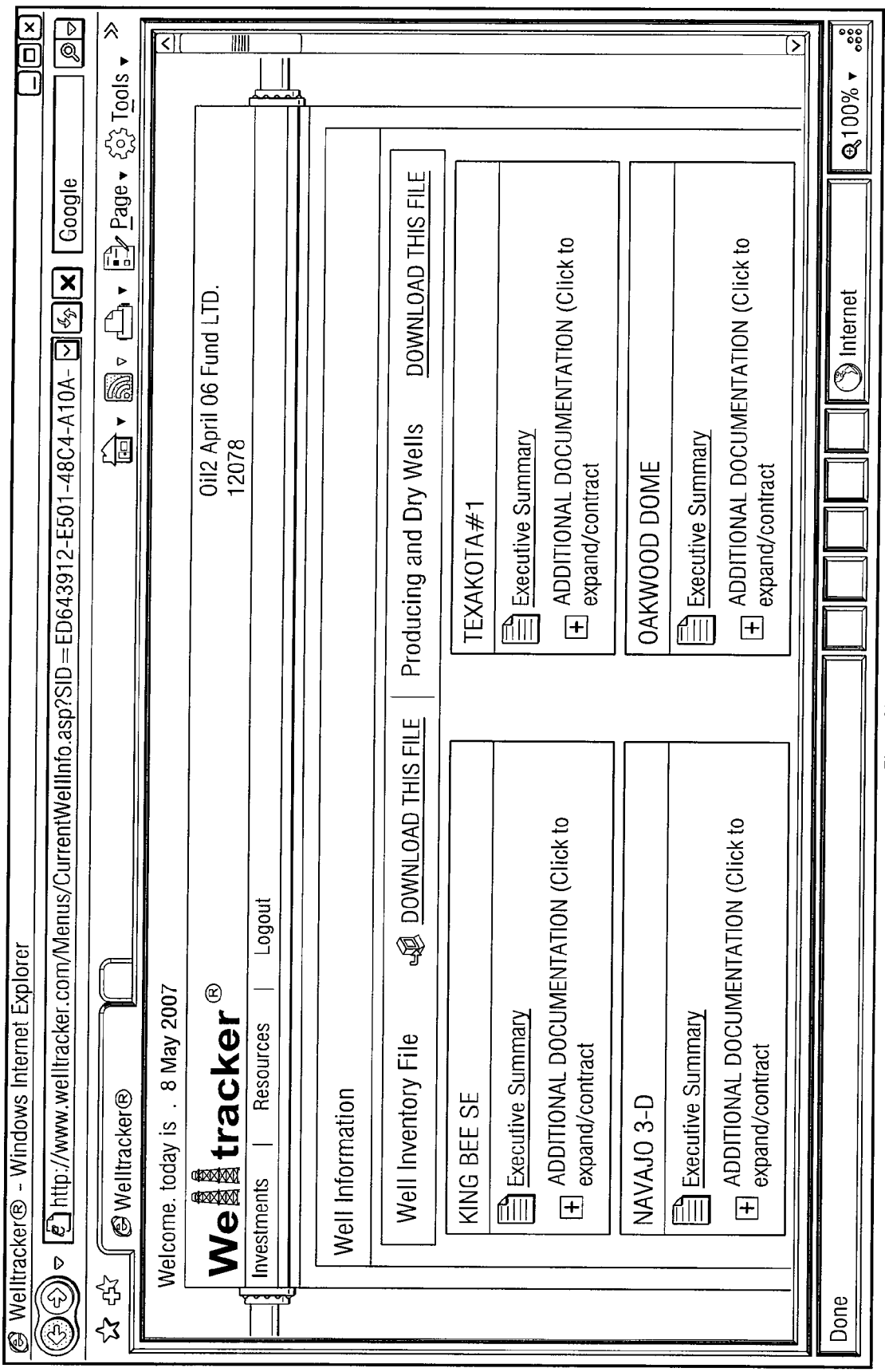

FIGS. 6A-6C include a description of a particular embodiment of WellTracker, in accordance with a particular embodiment of the present disclosure. The figures include screenshots that illustrate the type of information that is obtained, stored and used to accomplish the methods described herein.

Additional information about WellTracker is reproduced below:
Major Components Areas of Well Tracker
Investor/Broker Data
Well Price-Cost Information
Deposit Information
Commitment Information
TBA, Refunds, Transfers etc.
Well Processing
   (Dry Wells, Overruns, Cash Calls, Contingency Fees)
Well Summary and Business Snap Shot
Investor-Broker Communication Tools
Well Update Communication Tools/Pages
Broker Tools and Broker Interface
Investor Tools, Interface and Commitment Requests.
Design Information Flow
Well Income and Expenses
Audit and Change Logs
User Access, Network Security and Data Backups
Event Registration . . . Workshops.
Business Process Documentation and Diagrams
User and Technical Documentation
Change Requests and Enhancements.

Well Tracker

Each of the following areas describes a section of well tracker, what is done, what is part of a base package, or ongoing customization.
Well Participation and Payment Tracking for Admin, Reps and Investors
  Admin:
  Base Package Needs: Summary Reports
  Customization Needs Secondary Investment/Investor
  Investment Split
  Fund Management.
  Summary Reports
  Reps:
  Base Package Needs: Activating the links
  Customization Needs Lead management
  Activity Investment Investors:
　Base Package Needs: Activating the links
　Customization Needs Lead management
　Activity Investment
Entering Well Expenses and Revenue
　Base Package—na
　Customization: Chart of Accounts
　Income/Expense Data Import
Ongoing Commission Processing
　Base Package—na
　Customization: Registered Agent/Referring Agent
Replicated Broker and Well Prospect Web Sites
　Base Package—Base Well Page
Using the Systems Email Communication Tools
　Base Package—Ability to send emails to brokers/investors
　Ability to enter Well log and send
　Customization: Various Cash Call and other letters.
Year End K1 Reporting
　Base Package—Formatted Reports
　Customization—Special Data imports, auto create PDF files
Management Reports
　Base Package Requires manual data input to account or incomplete history.
Accounting Hooks?
　Export Participation
　Export Deposits
Documentation and Source Code
　Base Package User manual data
　Customization: Technical Manual.

Figure 3:
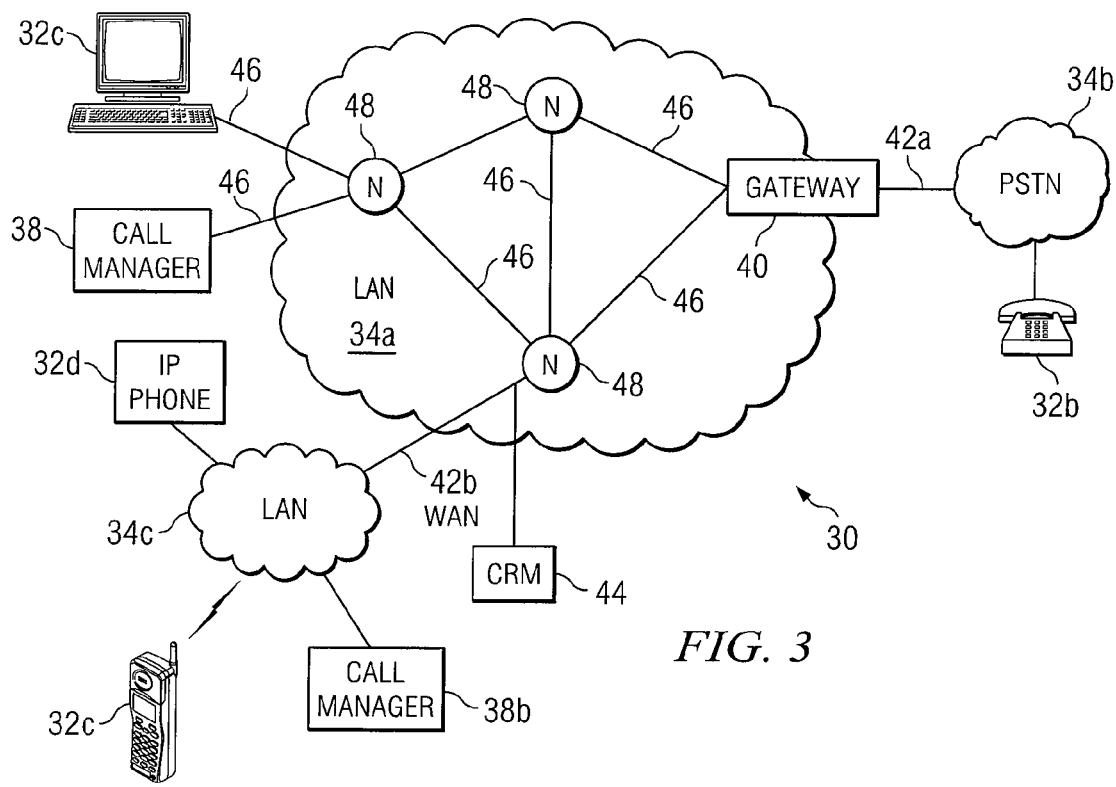
FIG. 3 illustrates a communication network that may be used to facilitate the systems and methods of the present disclosure.

FIG. 3 illustrates a communication system 30 that may be used in accordance with the teachings of the present disclosure. Communication system 30 provides for communication between and among a plurality of endpoints 32a-32d and an investment transaction client relationship management (CRM) tool 44, over communication networks 34a-34c. CRM tool 44 is used to collect, solicit, record, store, manipulate, retrieve and/or report information regarding investors, partners, brokers, wells, and transactions, pursuant to the teachings of the present disclosure. As described above, participants in the transaction may include investors, partners (general and limited), third party industry partners, brokers, dealers, etc., any one or more of which may communicate through the CRM tool 44 using endpoints 32a-32d.

In accordance with a particular embodiment of the present disclosure, a user of CRM tool 44 may have several endpoints associated with that user. For example, a single user may have a computer (32c), an office phone (32d), a mobile phone (32a) and a home telephone (32b) associated with that user. Thus, CRM tool 44 may be used to collect or report information from or to any one or more of endpoints 32a-32d.

It will be recognized by those of ordinary skill in the art that endpoints 32a-32d, call managers 38a-b, and/or gateway 40 may be any combination of hardware, software, and/or encoded logic that cooperate to provide communication services to a user. For example, each endpoint 32a-32d may include a telephone, a computer, a video monitor, a camera, an IP phone, a cell phone, or any other communication hardware, software, and/or encoded logic that supports the communication of packets of media (or frames) using communication networks 34a-34c. Endpoints 32a-32d may also include unattended or automated systems, gateways, other intermediate components, or other devices that can establish media sessions. Although FIG. 3 illustrates a particular number and configuration of endpoints, call managers, segments, nodes, and gateways, communication system 30 contemplates any number or arrangement of such components for communicating media. Furthermore, the endpoints 32 of system 30 may be associated with any number of different users.

In the illustrated embodiment, communication network 34a comprises a local area network (LAN) that couples multiple endpoints 32a-32d for the establishment of communication sessions between a plurality of endpoints 32a-32d distributed across multiple cities and geographic regions. Generally, network 34a provides for the communication of packets, cells, frames, or other portions of information (generally referred to as packets herein) between endpoints 32a-32d. Communication network 34a includes a plurality of segments 46 and nodes 48 that couple endpoint 32a with call managers 38a and 38b, gateway 40, and communication networks 34b-34c. Nodes 48 may include any combination of network components, gatekeepers, call managers, routers, hubs, switches, gateways, endpoints, or other hardware, software, or embedded logic implementing any number of communication protocols that allow for the exchange of packets in communication system 30.

Communication network 34b is a public switched telephone network (PSTN) and couples endpoint 32a with communication network 34a through gateway 40. Communication network 34c is another LAN, which couples endpoints 32a and 32d with communication network 34a. Communication links 42a and 42b couple communication networks 34c and 34b to communication network 34a, respectively. A communication link 42c couples communication networks 34b and 34c. In particular embodiments, communication link 42a is a wide area network (WAN), which couples LANs 34a and 34c.

Although the illustrated embodiment includes three communication networks 34a-34c, the configuration of networks 34a-34c and communication links 42a-42c are provided as merely one example configuration of a system 30 for establishing communication sessions between and among network components. The term "communication network" should be interpreted as generally defining any network capable of transmitting audio and/or video telecommunication signals, data, and/or messages, including signals, data or messages transmitted through text chat, instant messaging and e-mail. Any one of networks 34a-34c may be implemented as a local area network (LAN), wide area network (WAN), global distributed network such as the Internet, Intranet, Extranet, or any other form of wireless or wireline communication network. It is generally recognized that communication networks 34a-34c may include any combination of networks and that system 30 may include fewer or more networks 34a-34c as is required by the number of endpoints 32 or the desired traffic across system 30.

In a particular embodiment, communication network 34a employs voice communication protocols that allow for the addressing or identification of endpoints, nodes, and/or call managers coupled to communication network 34a. For example, using Internet protocol (IP), each of the components coupled together by communication network 34a in communication system 30 may be identified in information directed using IP addresses. In this manner, network 34a may support any form and/or combination of point-to-point, multicast, unicast, or other techniques for exchanging media packets among components in communication system 30. Any network components capable of exchanging audio, video, or other data using frames or packets, are included within the scope of the present invention.

Network 34a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 34a may also be coupled to non-IP telecommunication networks through the use of interfaces or components, for example gateway 40.

In the illustrated embodiment, communication network 34a is coupled with PSTN 34b through gateway 40. PSTN 34b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths.

Technology that allows telecommunications to be transmitted over an IP network may comprise Voice over IP (VoIP), or simply Voice over Packet (VoP). In the illustrated embodiment, endpoint 32d, call managers 38a-38b, and gateway 38 are IP telephony devices. IP telephony devices have the ability of encapsulating a user's voice (or other input) into IP packets so that the voice can be transmitted over network 34a. IP telephony devices may include telephones, fax machines, computers running telephony software, nodes, gateways, or any other device capable of performing telephony functions over an IP network.

Figure 4:
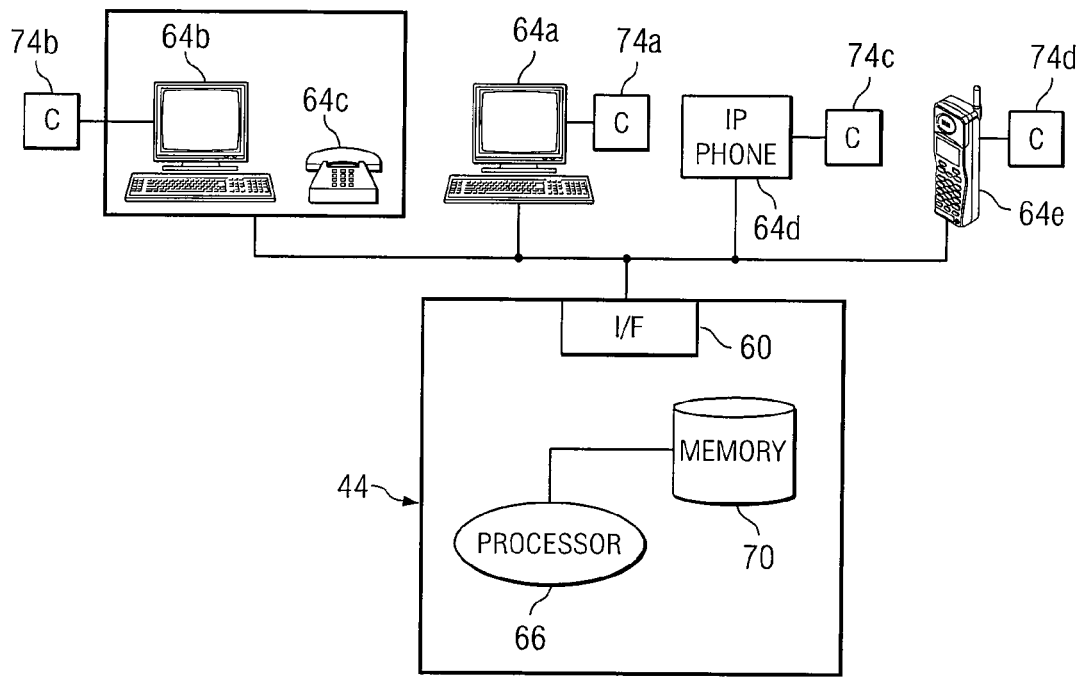
FIG. 4 illustrates a communication system that may be used to facilitate the systems and methods of the present disclosure.

FIG. 4 illustrates a CRM tool 44 in more detail, in accordance with a particular embodiment of the present invention. CRM tool 44 includes an interface or input ports 60 which couple CRM tool 44 with a communication network 34c. Thus, CRM tool 44 may be coupled with any one or more of endpoints 32a-32d to collect, store, manipulate and/or report information designated for, or received the user(s) of endpoints 32a-32d. Any one or more of endpoints 32a-32d may also be used to access, retrieve, store and/or manipulate such information, by any authorized user of CRM tool 44.

Processor 66 may be a microprocessor, controller, or any other suitable computing device, resource, or combination of hardware, software and/or encoded logic that allows processor 66 to receive and process information from/for end users. Processor 66 may also be used to identify authorized users of CRM tool 44, and allow access to segregated accounts of the authorized user. Processor 66 may also be used to solicit, record, store, process, manipulate and/or retrieve information stored in CRM tool 44.

Memory module 70 may be any form of volatile or non-volatile memory including, without limitation, magnetic media, optical media, random access memory (RAM), read-only memory (ROM), removable media, or any other suitable local or remote memory component. In particular embodiments, memory module 70 includes a list for each end user 62 in system 30. Memory module 70 may also be used to store users' information of CRM tool 44, in partitioned accounts associated with those users, such that access to information of a particular partitioned account is only granted to a user with authorization (e.g., username and password).

The method below illustrates one example embodiment of a process and procedure for forming a two party general partnership (having Oil2 Holdings, Inc. as the managing general partner), in accordance with the teachings of the present disclosure.

Initial Set-Up of an Oil2 2-Party Partnership:

1. Brokers will submit to Oil2, the name and contact information for each prospective Investor who is interested in investing through an Oil2 2-Party General Partnership structure. Brokers must confirm the proper name for the investing entity before forwarding the request to Oil2.

2. Oil2 will review the request, insure that the Investor information is complete, and prepare the 2-Party PPM. Oil2 will e-mail an electronic copy (and/or send a hard copy) of the Confidential 2-Party Partnership PPM to the prospective Investor using the "read-notify" software (may send a hard copy to Investors without e-mail or to those who request an additional hard copy). Oil2 will maintain a PDF copy of the PPM on file on the Oil2 server.

3. Oil2 will initially structure the Partnership name in the PPM as "Oil2 'Name of Investor' General Partnership" with a provision in the Subscription documents that will allow the Investor to change the name of the partnership to whatever suits him/her. If the Broker can give the Investor's preferred Partnership name to Oil2 before it publishes the PPM, then that name will be inserted throughout the PPM as chosen by the Investor. NOTE: "Oil2" does have to be a part of the Partnership name since it is the Managing General Partner of the 2-Party General Partnership.

4. Oil2 will maintain a log of all 2-Party PPM's sent out to Investors and verification that they have received and opened the PPM file. Oil2 will also insure that the e-mail sent to the Investors contains a statement disclosing the use of the "read-notify" software (this is automatically done now by the software); and that the e-mail from Oil2 to the Investor is strictly for personal use only. Oil2 will send a hard copy version of the PPM's to Investors who do not have (or will not use electronic communications); or to Investors who request a hard copy of the PPM. Any Investor that "opts-out" of using e-mail communications must provide a fax number that Oil2 can use for time-sensitive communications (i.e., opt-out notifications).

5. Oil2 will print a hard copy version of each 2-Party Partnership PPM and will deliver the copies of these newly-issued 2-Party PPM's to CFSI (in-house Broker Dealer) once per week, for CFSI's records.

6. Oil2 will maintain version control for the 2-Party General Partnership PPM's, including a detailed log of the changes made between versions. There will be a version notation at the bottom footer of each page of the PPM.

7. Once the Investor has received and reviewed the 2-Party General Partnership PPM, he/she will complete the subscription pages and return those documents along with his/her initial installment funds to CFSI. The Subscription documents will contain an "opt-in/opt-out" election for the Investor to indicate his/her preference in receiving notifications via e-mail versus hard copy.

8. A P.C. Bank (PCB) Cash Management Enrollment Form will also be included in the Subscription documents section of each PPM. This form will have two sections: 1.) the top portion will be completed by the Investor Partner; and 2.) the bottom section will be completed by Oil2 staff and PCB staff. This form will authorize and specify the Investor's level of access to the 2-Party Partnership's Capital (operating) Account, and to the 2-Party Partnership's Revenue Account (if one is set-up).

9. In the subscription documents (on the signature pages), the Investor Partner will have the option to indicate whether he/she does or does not want to set up a 2-Party Partnership Revenue Account at this time.

10. The Cash Management Enrollment Form and subscription documents are sent by the Investor into the CFSI office. CFSI staff reviews the subscription documents for compliance; physically signs and dates the documents indicating CFSI approval; scans the documents, loads the scanned documents onto a commonly accessed Oil2 server; and forwards the funds and PCB Cash Management Enrollment Form to PCB. Oil2 will forward the PCB Cash Management Enrollment Form to Oil2. Oil2 will hold the installment funds for deposit until after Oil2 gets the PCB 2-Party Partnership bank account(s) set up.

11. When the Cash Management Enrollment Form and subscription documents arrive in the Oil2 office, Oil2 will fill in the Account Description, Type of Account and Access. The Investor Partner will have Read Access ONLY to his/her Capital (operating) Account; and Full Deposit and Withdrawal Access to his/her Revenue Account (if he/she chooses to also open a Revenue Account with PCB).

12. Oil2 will use the information from the scanned Partnership subscription documents to obtain an EIN (online) from the IRS website for the 2-Party partnership. The IRS provides (back to Oil2) a confirmation of the application along with a provisional EIN.

13. Oil2 then submits an electronic copy of the subscription documents plus the EIN to PCB to set-up a bank (Capital) account for the 2-Party Partnership. (Oil2 also copies this e-mail transmission onto the Oil2 server and to CFSI.) These 2-Party Partnership accounts at PCB should have the same two first characters in the account name; e.g., "2P". The PCB account naming protocol will be "2P CAP Oil2 . . . Partnership Name" and "2P REV Oil2 . . . Partnership Name" to distinguish between 2-Party Partnership Accounts and other Oil2 Accounts at PCB; and to distinguish between 2-Party Capital Accounts and 2-Party Revenue Accounts.

14. Oil2 will also complete the required account information on the PCB Cash Management Enrollment Form; have Oil2 sign the Form on behalf of Oil2 as the Managing General Partner; then forwards the Form onto PCB for processing account access. The legal address for the Partnership will be the Oil2 P.O. Box in Irving; but the Partnership PCB bank account address will be in care of the Investor at the Investor's preferred mailing address. Oil2 will include the same wiring notification instructions to PCB as currently used for Well Partnership accounts (i.e., notify Oil2 via e-mail.)

15. As soon as PCB replies (electronically) to Oil2 (and all designated Oil2 and CFSI staff) to confirm that the account is set-up and has an account number(s), Oil2 will record that information. Oil2 will deposit the Investor's installment funds into his/her Partnership Capital (operating) account after Oil2 gets the 2-Party Partnership bank account(s) set up at PCB. Oil2 will use temporary deposit slips to make these deposits into these accounts; but will not need (use) checks or deposit stamps for these accounts.

16. After Oil2 receives notification from PCB re: the account set-up, he will review the Investor's scanned documents, add Oil2's signature, add password protection to the documents, and forward the documents (including subscription documents, EIN, and PCB account information), to the Investor(s) as confirmation of their investment and establishment of their 2-Party General Partnership. [Follow current deposit funds process.] Oil2 keeps a protected copy of documents in the subscription blotter (on the "B" drive on the Oil2 server) along with a read-notify receipt. Also, Oil2 copies CFSI when the documents are sent to the Investor. Oil2 will catalog and archive the subscription documents.

17. Oil2 will set-up the 2-Party Partnership account in Well Tracker. Oil2 will identify any 2-Party Investor Partner who holds working interest in wells prior to their decision to participate in the 2-Party Partnership. Oil2 will notify the Investor's Broker to contact the Investor to discuss transferring their prior investment holdings (working interest) under the 2-Party Partnership. Oil2 has designed an e-mail form to facilitate this transfer. Oil2 will use a process by which Well Tracker (WT) and the Integrated Oil & Gas Information System (IO&GIS) can accommodate tracking these transfers.

Once the transfer has been executed, the Investor Partner, through the 2-Party Partnership, becomes eligible to participate in offset wells originating from their former portfolio (pre-2-Party). The "parent-child" relationship in Well Tracker will be accomplished through account numbers and the identity of the entity identified in the "Investment Entity" field.

18. Oil2 will set-up the 2-Party Partnership account in Quickbooks (or the replacement accounting system). The account in the IO&GIS. These Accounts will be set-up with the proper class codes to distinguish between the 2-Party Partnership's D&T funds, Completion funds, and Overrun funds.

19. PCB is able to support different levels of access and security on the 2-Party Capital Account versus the Revenue Account. The Investor can see both accounts at the same time, using the same log-in, but with different levels of access to the two Accounts.

20. PCB has set up a special "master" account from which fees and/or other charges will be deducted for these 2-Party Partnership accounts. The name of the account is "2P Fee Oil2 Lead Account" and the account is funded with $500 seed money (as of Nov. 17, 2006).

21. If any 2-Party Partnership account is inadvertently hit with a transfer and it does not have sufficient funds to cover the transfer, PCB will not execute the transfer, but will send a notification via e-mail to Oil2 that the account is in an "insufficient funds" status.

22. Oil2 will carefully monitor the 2-Party PCB accounts to identify any accounts that might be approaching a minimum funding level (see min funding level discussion below).

23. PCB will generate duplicate bank statements for each 2-Party Partnership Capital Account. Hard copy versions of the bank statements will be mailed to the Investor Partner's physical address and to Oil2 for reconciliation of the 2-Party Capital Accounts.

Internal Operating Procedures for Oil2 2-Party Partnerships:

1. Once per week (or more often if required), Oil2 will identify all the new 2-Party Partnership funds that have been deposited in PCB during the prior week so Oil2 will know which accounts have funds available to be moved. Oil2 will transfer the appropriate "Blue Sky" fee assessment amount from each new 2-Party Partnership Capital Account over into the "Oil2 Blue Sky Fee" account at PCB. The Blue Sky fee assessment will vary by Investor according to their state of origin.

2. Oil2 will assess each 2-Party Partnership for Blue Sky Fees which must be paid annually on behalf of each Well Partnership in states where interests in that Well are sold. Oil2 must order checks for this account so that Blue Sky fees may be paid from this account. Oil2 will pay the Blue Sky fees from this Oil2 Blue Sky Fee account approximately 15 to 30 days after the Well is initially funded. Oil2 will file the Form D for each Well Partnership in each state which has an Investor with funds in the Well Partnership.

3. After receiving the file of the new 2-Party Partnership deposits each week, Oil2 will also assess each 2-Party Partnership for 13% of the funds just deposited (3% for CFSI fees and 10% for Broker commissions). This 13% will be transferred from each 2-Party Partnership Capital account into the CFSI account at PCB. NOTE: The 13% will be assessed on ALL funds deposited into the 2-Party Partnership account regardless of how those funds are ultimately used (drilling, testing, completion or overrun).

4. Oil2 will present preliminary geological data, participation terms and its recommendations on prospective Wells to the Well Approval Committee (WAC). The WAC will meet once per week to review proposed Wells and either approve or disapprove those Wells for further evaluation for Oil2's proposed well inventory. (See separate document for detailed Well Approval Committee procedures.)

5. Oil2 will review the prospects' participation terms, AFE, Participation Agreement, JOA and other documents associated with the Well and/or Operator. In most cases, Oil2 will be required to coordinate with the Well Operator and/or Well Prospect Generator to obtain final versions of all the documentation needed for Oil2 to be able to approve the prospect and generate the PPM for the Well. Based on their acceptance and approval of the Well, Oil2 will prepare the final version of the Well Information Sheet and the Excel driver file needed to build the Well Partnership PPM.

6. In the process described above, Oil2 will notify the Well Operator of Oil2's available commitment and the Well Operator will either accept or reject Oil2's proposed commitment. If the available commitment is rejected by the Well Operator, Oil2 will attempt to negotiate a revised commitment level—otherwise, Oil2 will be forced to back out of the Well.

7. If the Oil2 commitment is accepted by the Well Operator, Oil2 will set-up and register each Well Partnership as a Limited Partnership with the State of Texas and obtain an EIN number. Oil2 must add the current list of 2-Party Partnerships, plus all individual Investors to the list of General Partners for the Well when it sets up the new Well Limited Partnerships on the SOS website. [The list of 2-Party General Partners will be those available to be placed in the Well Partnership at the time the Well Partnership is formed.]

8. Oil2 will then submit the EIN and proper documentation to PCB to set-up a bank account for the Well Partnership.

9. After each new Well Partnership is set-up, Oil2 will transfer or withdraw funds from the Oil2 Blue Sky Fee account to pay those fees in all appropriate states where we have Investors or 2-Party Partnerships with funds placed in that Well Partnership.

10. When a Well has been approved for funding (usually within 60 to 90 days before expected spud date) and the Well Partnership PPM has been generated, Oil2 will release a "read-notify" e-mail to all 2-Party Partnership contact individuals (Investor Partners) notifying them that they have 72 hours to respond to opt-out of investing in that specific well. The e-mail will also include a notification that funds will be moved from each individual 2-Party Partnership Capital account into the Well Partner-ship account after the 72 hour opt-out period has elapsed. Oil2 will notify the Brokers (and all designated internal staff), via e-mail, as the exact time when the e-mails were released so that everyone knows when the response clock has started. For those Investors who have opted out of e-mail notification, Oil2 will electronically fax a notification to these people. [Oil2 uses a standard e-mail and fax form with a changeable field for the Well name so it can use it like the current election and cash call letters.] Oil2 will also insure that a copy of these e-mails is sent to CFSI for their records and audit trail.

11. Oil2 will post the Well Executive Summary, Term Sheet and Geological information in Well Tracker) for Investor access (via their own personal password-secured access). Oil2 will include information in the "read-notify" e-mail (or fax) instructing the Investors as to the procedures needed to access this information. The "read-notify" e-mail (or fax) will also include an Executive Summary sheet providing basic information regarding the Well, including: estimated cost, expected performance, participation terms, name, Operator, location, estimated reserves, along with supporting geological data. Oil2 will maintain a log of all e-mail and fax communications sent to Investors which require time sensitive responses.

12. After the 72 hours has elapsed, Oil2 will determine exactly how many 2-Party Partnership Investors have opted out of the proposed Well. Oil2 will combine the total investment dollars of the 2-Party Partnerships with the investment commitments from individual Investors plus any commitment from other Investors—to arrive at a total dollar and working interest commitment that Oil2 can actually invest into the proposed Well—and how much extra working interest is available for Brokers to sell to new Investors or up-sell to current Investors.

13. Oil2 will compile a list of all 2-Party Partnership Investors which need to have Drilling & Testing funds (Installment #1) electronically transferred from the 2-Party Capital accounts over into the Well Partnership account. To prepare for a batch transfer of funds from 2-Party Capital accounts into a Well Partnership account, Oil2 prepares an Excel spreadsheet that contains (for each Investor): Date, Investor's Well Tracker ID number, Investor's Name, PCB bank routing number, originating 2-Party PCB bank account ID number, dollar amount to be transferred, type of transfer (D&T, Completion, Overrun, etc.), Well's Well Tracker ID number, Well Name, and the receiving Well Partnership's PCB account ID number. [This list will initially be developed in Excel; then transferred into Well Tracker as soon as possible so that Well Tracker can automatically update this list each time it is accessed.]

14. To execute a batch transfer, Oil2 electronically submits the file to PCB to execute the batch transfer (via ACH software and procedures) and PCB will e-mail a confirmation back to Oil2 that the transfer has been completed.

15. After the transfers into the Well Partnership account are complete, Oil2 will then execute a transfer of 15% of the D&T funds (funds originating from the 2-Party accounts ONLY) from the Well Partnership account into the Oil2 Operating Account for its management fees. After the transfers have been executed, the file (and a record of the transfers) will go to Accounting to be recorded into the IO&GIS and Well Tracker to maintain a complete financial record of the allocation of funds between accounts (by proper class).

16. After the funds have been transferred into the Well Partnership accounts, Oil2 will transfer or ACH payments (or pre-payments) from the specific Well Partnership Account in PCB to the Well Operator for Prospect fees, Lease and G&G, and/or AFE D&T charges (IF sufficient funds reside in the 2-Party Capital Account). After the funds have been transferred to Well Operator, those payments can be properly recorded into the IO&GIS for tracking against the AFE and JIB invoices. If funds cannot be transferred to the Well Operator electronically or via ACH, Oil2 will generate a hard copy check from the IO&GIS in the next Accounts Payable cycle and sent to the Operator.

17. Oil2 will update and maintain the AFE module of the IO&GIS so that Oil2 can evaluate the AFE budgeted costs against the actual JIB charges received from each Operator on each Well. This analysis will support well audit activities.

18. Oil2 will update and maintain the Accounts Payable module of the IO&GIS so that Oil2 can track and manage invoices received from each Operator on each Well and our payments to Well Operators. This activity will support our cash management efforts.

19. Oil2 will initially be responsible for setting-up and maintaining our central repository and files for all paper and electronic documents necessary to establish an audit trail and history of transactions and activities for these 2-Party Partnerships.

20. When each Well is closed out and accepting no new Investors, Oil2 will review the Investors' status in the Well (in Well Tracker); then generate an electronic file (in Excel) to set up the DOI deck in the IO&GIS.

Internal Operating Procedures for Completions and Overruns:

1. When a Well Operator notifies Oil2 that the decision has been made to Complete a well, the Well Approval Committee will meet to consent or non-consent to the Completion.

2. If the Well Approval Committee consents to Complete the well, Oil2 will notify all 2-Party Partnership Investors that Oil2 has consented to Complete the Well and that their funds will be transferred from their Capital (operating) accounts at PCB into the Well Partnership bank account at PCB within 24 to 48 hours. Oil2 will send a copy of these e-mails to CFSI for their records and audit trail. Oil2 may utilize a mail-merge cash call/notification process as a substitute for this procedure as need be.

3. Oil2 will compile and maintain a list (in Well Tracker) of all 2-Party Partnership Investors and Monthly Drilling Funds which need to have Completion funds (Installment #2) electronically transferred from the 2-Party Partnership Capital accounts and/or the Monthly Fund accounts over into the Well Partnership account. This transfer file will be constructed by Oil2 in the same manner as described above for D&T transfers.

4. To execute a batch transfer, Oil2 electronically submits the file to PCB to execute the batch transfer (via ACH software and procedures) and PCB will e-mail a confirmation back to Oil2 that the transfer has been completed. After the transfers into the Well Partnership account are complete, Oil2 will then execute a transfer of 15% of the Completion funds (funds originating from the 2-Party accounts ONLY) from the Well Partnership account into the Oil2 Operating Account for its management fees.

5. After the transfers have been executed, the file (and a record of the transfers) will be recorded into the IO&GIS and Well Tracker to maintain a complete financial record of the allocation of funds between accounts (by proper class).

6. After the funds have been transferred into the Well Partnership accounts, Oil2 will transfer or ACH payments (or pre-payments) from the specific Well Account in PCB to the Well Operator for the AFE Completion charges (IF sufficient funds reside in the 2-Party Capital Account). After the funds have been transferred to Well Operator, Oil2 will record those payments into IO&GIS for tracking against the AFE and JIB invoices. If funds cannot be transferred to the Well Operator electronically or via ACH, Oil2 will generate a hard copy check from the IO&GIS in the next Accounts Payable cycle and notify Oil2 when the check is cut and sent to the Operator.

7. When a Well Operator notifies Oil2 that the decision has been made to recommend that a material change incurring an additional cost Overrun be performed on a Well, the Well Approval Committee will meet to consent or non-consent to the Overrun activity.

8. The processes for handling the Overrun charges on a Well will be the same as noted above for handling Completion activities; except that the funds withdrawn from each 2-Party Partnership Capital account will be taken from the Working Capital Reserve portion of each of those accounts (and should be so recorded in the IO&GIS and Well Tracker). The Working Capital Reserve is approximately 20% of each deposit of new funds into the 2-Party Partnership Capital account. Oil2 will assess 15% of the Overrun transfers from the Working Capital Reserve funds as Oil2's management fee in the same manner as done for D&T and Completion funds transferred.

9. Oil2 will monitor the 2-Party Partnership accounts in Well Tracker on a daily basis. If an Investor does not have sufficient funds remaining in his/her 2-Party Partnership Capital account, Oil2 will notify the Investor's Broker that the specific 2-Party account is in a "below minimum" condition. [We will initially establish the account minimum trigger of $2,000 for this notification to take place. If Oil2 can program the capability into Well Tracker, we will allow the Broker to set the minimum for each 2-Party Partnership—OR, set the minimum to be 2× or 1.5× the minimum amount to be invested into each specific Well.] Oil2 will notify the Investor via "read-only" e-mail (or fax) that he/she has five (5) days to place funds into the 2-Party Partnership account to replenish the account above its minimum level. Oil2 prefers that the Investor be able to transfer the funds electronically, wire the funds, ACH the funds or send a check to Oil2 to get the funds into the 2-Party Partnership Capital account. If Oil2 notices a 2-Party Partnership account in PCB reaching the minimum threshold, it will initiate the contact process as outlined above. If Oil2 notices a 2-Party Partnership account in QB reaching the minimum threshold, it will initiate the contact process as outlined above.

10. Since 2-Party Partnership funds may come into CFSI or directly (electronically) into PCB, PCB will have to notify designated staff at CFSI and Oil2 of ALL funds received electronically into the 2-Party Partnership accounts at PCB to avoid net capital violations at CFSI. Oil2 must also transfer the 13% commissions and compliance fee over into the CFSI account for all of these newly received funds.

Internal Operating Procedures for Revenue Distribution:

1. IF POSSIBLE, Investors who prefer to have their revenue checks distributed via EFT will be flagged within the IO&GIS and separated from those Investors who prefer to receive their revenue as hard copy checks via the USPS.

2. Most of the 2-Party Partnerships will have a Revenue Account (we assume) set-up with PCB. The big issue is whether the IO&GIS can create 2 files, or segregate the Revenue check file into two sections; one for hard copy checks and one for electronic transfer.

3. If the IO&GIS can create a file of those Investors who have elected to receive their revenue checks electronically, that file will be downloaded and forwarded to Oil2 to update Well Tracker—IF this function is needed for the Well Tracker database.

4. Oil2 will sort the file and add in the Revenue Account numbers (as the "transfer to" account) for each Investor; and the Oil2 Revenue Account number on all records as the "transfer from" account.

5. Oil2 will transmit the file to PCB to execute the transfers in batch mode from the Oil2 Revenue Account into each separate 2-Party Revenue Account (if the account is resident at PCB). Oil2 will make a decision as to whether Oil2 will offer this option to other Investors beyond the 2-Party Partnerships. If the receiving account is not resident at PCB, PCB will need to execute an ACH funds transfer to the receiving account based on the account number and routing number for the receiving financial institution. If Oil2 offers this option, Oil2 must collect the Investors' account numbers and routing numbers for non-PCB Investors.

6. When Oil2 receives confirmation from PCB that the funds have been transferred, Oil2 will send an e-mail confirmation to the list of Investors (including 2-Party Partnerships) who have elected to receive their revenue funds electronically.

7. The option for revenue netting is included in the current 2-Party Partnership PPM's Although the present invention has been described in several embodiments, a myriad of changes and modifications may be suggested to one skilled in the art, and it is intended that the present invention encompass such changes and modifications as fall within the scope of the present appended claims.

What is claimed is:

1. A computer-implemented method for processing investment transactions, the computer comprising a memory and a central processing unit, comprising:
    receiving, at a computer, investor information regarding each of a plurality of investors, the investor information including at least an identity, a minimum aggregate investment amount per unique investment opportunity in which an investor has participated, and a minimum number of required unique investments opportunities in which an investor must participate;
    wherein each of the plurality of investors is signatory to a respective general partnership agreement, each of the general partnership agreements sharing a common general partner, and wherein at least some of the investor information is derived from the terms of the general partnership agreement;
    receiving, at the computer, information regarding a future unique investment opportunity;
    determining, by the computer based on the investor information and the information regarding the future unique investment opportunity, one or more particular investors of the plurality of investors to notify regarding the future unique investment opportunity; and
    notifying the one or more particular investors of the plurality of investors of the future unique investment opportunity.

2. The method of claim 1, further comprising executing a respective unique investment Private Placement Memorandum (PPM) on behalf of each of the particular investors that will participate in the future investment.

3. The method of claim 1, wherein the investor information further comprises financial information and investor suitability information.

4. The method of claim 1, wherein determining whether the particular investor will participate in the future unique investment comprises providing each of the plurality of investors with a notification of the future unique investment and providing an opt-out period, and further comprising subscribing each of the plurality of investors that fails to respond during the opt-out period, to the future investment.

5. The method of claim 1, wherein determining whether the particular investor will participate in the future unique investment comprises providing each of the plurality of investors with a notification of the future unique investment, and providing an opt-in period, and further comprising subscribing each of the plurality of investors that responds affirmatively during the opt-in period, to the future investment.

6. The method of claim 1, wherein the unique investments comprise investments in oil and gas wells in geographically diverse locations and associated resource development thereof.

7. The method of claim 3, wherein each general partnership agreement provides for a minimum investment of approximately one thousand dollars per unique investment and a minimum number of approximately twenty required unique investments.

8. A system for processing investment transactions, comprising:
    an interface operable to:
        receive investor information regarding each of a plurality of investors, the investor information including at least an identity, a minimum aggregate investment amount per unique investment opportunity in which an investor has participated, and a minimum number of required unique investments opportunities in which an investor must participate;
        wherein each of the plurality of investors is signatory to a respective general partnership agreement, each of the general partnership agreements sharing a common general partner, and wherein at least some of the investor information is derived from the terms of the general partnership agreement; and
        receive information regarding a future unique investment opportunity;
    a processor operable to:
        determine, based on the investor information and the information regarding the future unique investment opportunity, one or more particular investors of the plurality of investors to notify regarding the future unique investment opportunity; and
        notify the one or more particular investors of the plurality of investors of the future unique investment opportunity.

9. The system of claim 8, wherein the processor is further operable to generate a respective unique investment PPM on behalf of each of the particular investors that will participate in the future investment.

10. The system of claim 8, wherein the investor information further comprises financial information and investor suitability information.

11. The system of claim 8, wherein the processor is further operable to provide each of the plurality of investors with a notification of the future unique investment and provide an opt-out period, and wherein the processor is further operable to subscribe each of the plurality of investors that fails to respond during the opt-out period, to the future investment.

12. The system of claim 8, wherein the processor is further operable to provide each of the plurality of investors with a notification of the future unique investment, and provide an opt-in period, and wherein the processor is further operable to subscribe each of the plurality of investors that responds affirmatively during the opt-in period, to the future investment.

13. The system of claim 8, wherein the unique investments comprise investments in oil and gas wells in geographically diverse locations and associated resource development thereof.

14. The system of claim 10, wherein each general partnership agreement provides for a one thousand dollar minimum investment per unique investment and a minimum number of 20 required unique investments.

15. A system for processing investment transactions, comprising:
    means for receiving investor information regarding each of a plurality of investors, the investor information including at least an identity, a minimum aggregate investment amount per unique investment opportunity in which an investor has participated, and a minimum number of required unique investments opportunities in which an investor must participate;
    wherein each of the plurality of investors is signatory to a respective general partnership agreement, each of the general partnership agreements sharing a common general partner, and wherein at least some of the investor information is derived from the terms of the general partnership agreement;
    means for receiving information regarding a future unique investment opportunity;
    means for determining, based on the investor information and the information regarding the future unique investment opportunity, one or more particular investors of the plurality of investors to notify regarding the future unique investment opportunity; and means for notifying the one or more particular investors of the plurality of investors of the future unique investment opportunity.

16. The system of claim 15, further comprising means for executing a respective unique investment PPM on behalf of each of the particular investors that will participate in the future investment.

17. The system of claim 15, wherein the investor information further comprises financial information and investor suitability information.

18. The system of claim 15, wherein means for determining whether the particular investor will participate in the future unique investment comprises means for providing each of the plurality of investors with a notification of the future unique investment and providing an opt-out period, and further comprising means for subscribing each of the plurality of investors that fails to respond during the opt-out period, to the future investment.

19. The system of claim 15, wherein means for determining whether the particular investor will participate in the future unique investment comprises means for providing each of the plurality of investors with a notification of the future unique investment, and providing an opt-in period, and further comprising means for subscribing each of the plurality of investors that responds affirmatively during the opt-in period, to the future investment.

20. A non-transitory computer readable medium encoded with logic, the computer readable medium comprising code being operable, when executed by a processor, to:

receive investor information regarding each of a plurality of investors, the investor information including at least an identity, a minimum aggregate investment amount per unique investment opportunity in which an investor has participated, and a minimum number of required unique investments opportunities in which an investor must participate;

wherein each of the plurality of investors is signatory to a respective general partnership agreement, each of the general partnership agreements sharing a common general partner, and wherein at least some of the investor information is derived from the terms of the general partnership agreement;

receive information regarding a future unique investment opportunity; determine, based on the investor information and the information regarding the future unique investment opportunity, one or more particular investors of the plurality of investors to notify regarding the future unique investment opportunity; and notify the one or more particular investors of the plurality of investors of the future unique investment opportunity.

* * * * *